US012549789B1

(12) United States Patent
Mackin et al.

(10) Patent No.: US 12,549,789 B1
(45) Date of Patent: Feb. 10, 2026

(54) SYSTEMS AND METHODS FOR MITIGATING AUDIO-VIDEO MISALIGNMENT

(71) Applicant: Amazon Technologies, Inc., Seattle, WA (US)

(72) Inventors: Alexander Charles Mackin, Stonehouse (GB); Andrew Collins, Eversley (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/597,377

(22) Filed: Mar. 6, 2024

(51) Int. Cl.
*H04N 21/242* (2011.01)
*H04N 21/2187* (2011.01)
*H04N 21/233* (2011.01)
*H04N 21/234* (2011.01)

(52) U.S. Cl.
CPC ....... *H04N 21/242* (2013.01); *H04N 21/2187* (2013.01); *H04N 21/233* (2013.01); *H04N 21/23418* (2013.01)

(58) Field of Classification Search
CPC ............. H04N 21/242; H04N 21/2187; H04N 21/233; H04N 21/23418
See application file for complete search history.

(56) References Cited

U.S. PATENT DOCUMENTS

2022/0335205 A1* 10/2022 Li ........................... G06F 9/451
2024/0195949 A1*  6/2024 Collins ................ H04N 21/242

OTHER PUBLICATIONS

U.S. Appl. No. 18/524,557, filed Nov. 30, 2023.

* cited by examiner

Primary Examiner — Nnenna N Ekpo
(74) Attorney, Agent, or Firm — Eversheds Sutherland (US) LLP

(57) ABSTRACT

Systems and methods for mitigating audio-video misalignment are provided. The systems and methods involve detecting an audio cue within an audio signal associated with the live content (for example, the audio captured by a microphone at the source of the live content). When the audio cue is detected, a visual element at the source of the live content is manipulated to produce a visual cue within the video signal of the live content. When the video and audio are being processed for transmission to the viewer devices, when a portion of the audio signal includes the audio cue, the corresponding video frame(s) may be checked to determine if the visual cue within the video frame(s). If not, then it may be determined a misalignment exists between the video and audio signals in the live content. An action may then be taken to remedy the misalignment, such as introducing a delay into the video or audio signal.

20 Claims, 8 Drawing Sheets

SYSTEMS AND METHODS FOR MITIGATING AUDIO-VIDEO MISALIGNMENT

BACKGROUND

Audio-video misalignment in live content is a common cause of customer dissatisfaction. Humans are highly attuned to visual scenes that do not match the expected audible sounds, which can ruin the enjoyment of the content experience. This is particularly irritating in live sports. As an example, audio-video misalignment may result in a viewer seeing a crowd yell in excitement just before a goal goes in or hearing a tennis ball impact sound after the ball has already been hit by a player. In a complex, live streaming experience, there are multiple factors that can introduce signal delays (for example, delays between the video signal and the audio signal) that individually may not cause a problem, but cumulatively can spoil the experience by causing noticeable misalignment in the audio and video. For example, such delays may be caused by factors such as hardware latency, differences in transmission times and/or processing times, etc.

The specific causes of the delays resulting in the misalignment may also be difficult to detect and diagnose. Detecting misalignment is easy for humans, but incredibly difficult to automate. There is no reliable existing machine learning solution. Some conventional signal processing techniques rely on the insertion of hidden watermarking patterns into the signal. This is undesirable, however, as it introduces latency and is also not practical in most scenarios.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depend on the context, encompass a plural number of such components or elements and vice versa.

DETAILED DESCRIPTION

Figure 1:
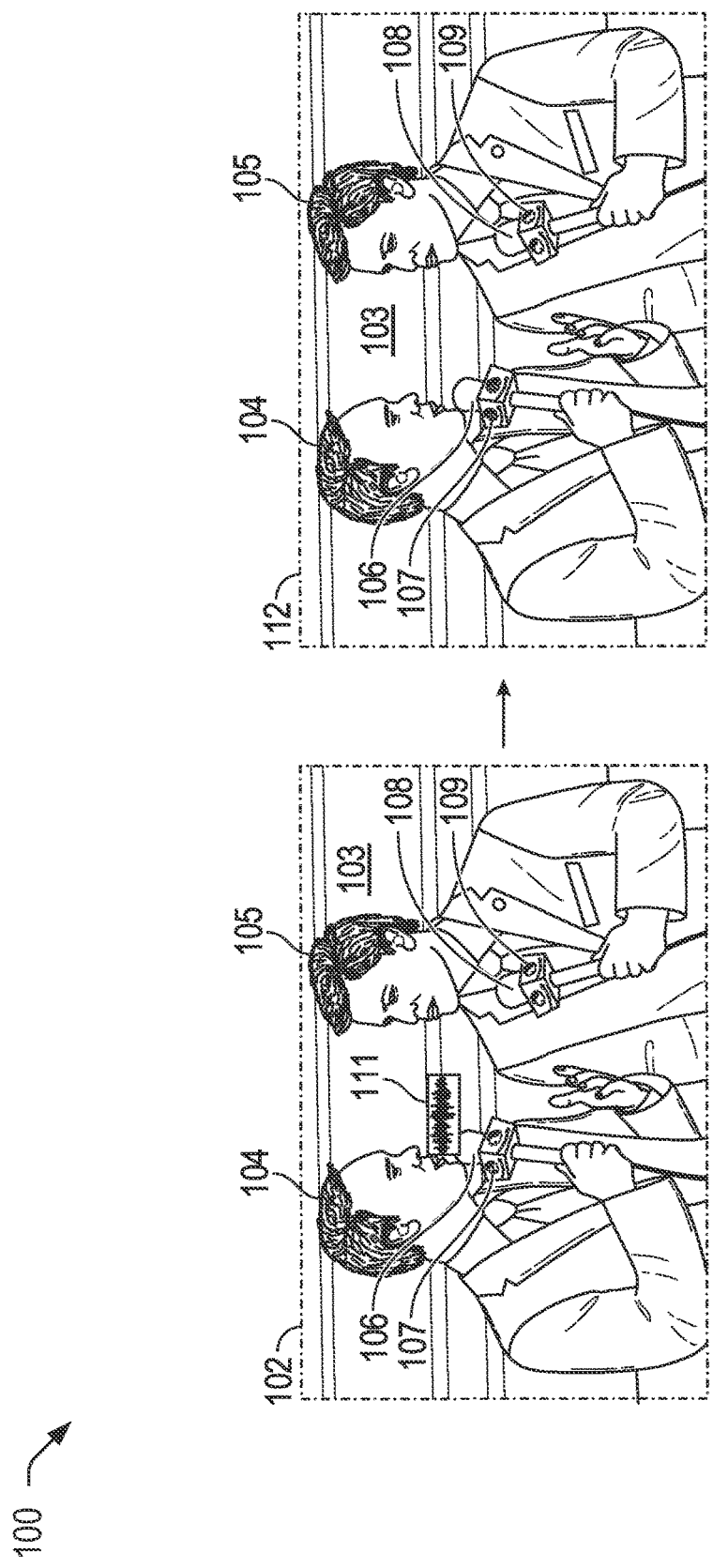
FIG. 1 depicts an example use case for mitigating audio-video misalignment in accordance with one or more example embodiments of the disclosure.

This disclosure relates to, among other things, systems and methods for mitigating audio-video misalignment. Particularly, the systems and methods may detect when a misalignment occurs between the audio and video signals associated with live content such as a live broadcast of a sports event or any other type of live content (however, the systems and methods described herein may also be applicable to any other types of content in which audio-video synchronization issues may occur, including pre-recorded content). The audio associated with the live content may be generally referred to as an "audio signal" and the video associated with the live content may be generally referred to as a "video signal" herein (however, the terms "audio content" and "video content" may also be used). For example, the audio signal may be in the form of an audio waveform that includes the audio from the live content and the video signal may include a number of video frames. Additionally, as used herein, the term "misalignment" may refer to a temporal misalignment that causes a portion of video to be presented along with audio that does not correspond with the video (for example, there may be a delay that exists between a visual image of a person speaking and the audio associated with the words the person is saying). When a misalignment is detected, the system may provide a notification of the misalignment such that the misalignment may then automatically be corrected in real-time while the live content is still being presented to viewers.

Conventional approaches to mitigating audio-video misalignment often involve performing post-processing of the video content. For example, a hidden watermark may be embedded within the video content in post-processing. The post-processing to add this watermark into the video content, however, introduces latency into the process given that adding the watermark adds further delay between the time at which the content is captured and the time at which the content is received by a viewer device for presentation.

Another approach involves the use of a deep neural network (DNN) for detection of audiovisual synchronization issues. This DNN architecture, for example, may include audio and visual feature extractors, feature selectors, a global transformer, and a linear classifier that in combination are used to identify audio-visual synchronization issues. The DNN may be trained in a self-supervised manner by artificially introducing an audio offset to some of the examples, calculating the expected class label by quantizing the offset, and then applying the cross entropy loss with the expected label and logits. Audio and visual feature extractors in the form of convolutional neural networks (CNN) may be used that receive the raw audio and video inputs and return a feature. The extractors for the different modes may be independent and maybe pre-trained for other downstream tasks.

The feature selectors may be an attention mechanism to select the aspects of the features useful for perform the audio-video synchronization task. For example, the video selectors might identify regions that include a talking pundit and the audio selectors might identify regions that include audio of a person speaking. An alternative view of the selectors is that they are mechanism for compressing the video into a reduced set of most informative tokens.

The feature selectors may be implemented using a cross-attention mechanism. In cross-attention, one set of tokens may be used as the query vector into the other set of tokens (in self-attention the query and key would both be transformed versions of the same set of tokens). The mechanism can be viewed as identifying parts of the feature tokens that are most similar to the selector tokens (for example, parts of the video that are audio-video correspondence events).

The global transformer may be a classification transformer encoder. The input may be the tokens for the different modes plus a classification (CLS) token and a MOD token to separate the two modes. This architecture use may use self-attention to identify relationships between the visual and audio tokens and distill this information into the CLS token. The linear classifier may receive the output of the global transformer at token 0 and may apply a linear classification to predict one of the 'N' offset classes.

In contrast with these conventional approaches, which introduce latency and computational complexity to the process, the systems and methods described herein use existing subtle visual elements that would otherwise be present within the live content as visual cues. That is, visual elements located at the physical source of the content may be modified for use as visual cues (rather than adding visual elements, such as watermarks, as post-processing elements). For example, if the live content is a sports event, the source of the content may be the stadium at which the sports event is hosted. As another example, if the live content is a live broadcast of a television news channel, the source of the content may be the studio in which the news channel is recorded. The use of these existing visual elements limits or eliminates visual distractions for viewers of the video content, while simultaneously providing the system with a visual cue without requiring additional visual elements to be added to the video signal in post-processing. Particularly, the existing visual elements may be selectively manipulated to provide a visual cue that may provide an indication of the specific audio that is associated with the video frame or frame(s) including the visual cue.

As a first example of these types of existing visual elements, a visual element may be a sponsored advertisement that is shown in a portion of the live content (for example, an advertisement displayed on a digital banner within the stadium or any other type of advertisement displayed in any other form). To provide a visual cue, the sponsored advertisement may be transitioned from one advertisement to another advertisement. These advertisements would otherwise be presented within the live content regardless of the use of the visual cues, so the visual cue is unnoticeable by the viewers. As a second example, a subtle change to the animation or a color of a logo may be provided. As a third example, a background color of a scoreboard may be changed. As a fourth example, a green screen background (or a portion of a green screen background) in a studio of a television show (e.g., a news show) may be modified. As a fifth example, a frequency at which the visual element is presented may be changed. These are merely a few non-limiting examples of such visual elements that may be manipulated to be used as visual cues and any other visual elements present at the source of the live content may similarly be used and may be manipulated in any manner to make any number of visual changes to the visual elements.

The manipulation of the existing visual elements to produce the visual cues used to identify audio-video misalignment may be performed based on audio cues from the live content. That is, portions of the audio signal may serve as triggers for generating the visual cues that may be used as the points of comparison in the video signal to the portion of the audio signal. For example, during a halftime break for an American football game, multiple game analysts (also referred to as "pundits" herein) may participate in a discussion about the game. In this specific example, audio cues such a specific pundit beginning to speak, a pause between speakers, and/or any other types of audio cues may be used as triggers to for the manipulation of an existing visual element to be performed to produce the visual cue. As a more subtle example, the identification of a phoneme such as "A" or "E" may be used as an audio cue. As yet another example, during the game, a referee may blow a whistle to indicate a time-out by a coach of one of the teams (or based on various other types of events that occur during the game), and the sound of the whistle may serve as an audio cue. These are merely a few non-limiting examples of portions of the audio signal that may be used as audio cues to produce a visual cue and any other portions of the audio may also be used.

The audio cues that are used as triggers to generate a visual cue as a point of comparison for audio-video misalignment may be determined in any number of suitable manners. For example, depending on the type of live content, specific types of audio cues may be pre-defined such that when these pre-defined audio cues are identified in the audio signal, a visual cue may be automatically generated. Continuing the example of the American football game, audio cues may be pre-defined for known events that occur during the game, such as the blowing of a whistle, the speaking of a pundit, an audible by a player on the field, and/or any other type of audio that is expected to occur during a regular American football game. However, in some instances, the audio cues may not necessarily be pre-defined. For example, rather than relying on specific types of events to use as audio cues, the system may instead periodically generate visual cues and may determine the audio that is occurring during that time, regardless of what the audio includes.

In some embodiments, a device may be configured to both detect the audio cues and generate the visual cues as well. Continuing the American football example, the pundits may each hold a microphone that they speak into when participating in the discussion about the game. The microphones may capture the pundits' speaking and the audio associated with the speaking may form a part of the audio signal that is processed and transmitted to viewer devices. Each microphone may also have a logo or other type of visual element provided on the microphone (for example, the microphone may include a display, a group of light emitting diodes (LEDs), and/or any other hardware and/or software elements that may be used to present a logo). A specific microphone may detect when a pundit using the microphone begins to speak (or any other type of audio cue). Based on the detection of an audio cue, the microphone may then manipulate the logo or other type of visual element provided on the microphone to produce the visual cue. For example, the microphone may change the color of the logo or an animation of the logo or other type of visual element, and/or may make any other type of change to the logo or visual element (an example of this is shown in the use case 100 of FIG. 1). As different pundits speak, the microphones associated with the speaking pundits may detect the speech and may modify the logo or other visual element. In this particular example, the system may use the visual cues on the microphones to align the audio of a particular pundit speaking with the associated video of the pundit speaking. This same approach may be used to align any other portions of the audio and video using any other types of devices in addition to microphones as well.

Once a visual cue is produced based on an audio cue, metadata may be added to the audio and/or video signal that provides an indication of the visual cue that should be present within the video signal for a given portion of the audio signal. When the live content, including the video and audio signals, is transmitted from the devices capturing the content (e.g., cameras, microphones, etc.) to the backend system(s) (for example, remote server(s) or other types of systems or devices perform processing of the content) that process the signals for transmission to viewers, the metadata may also be supplied. The backend system(s) may use this metadata to verify the alignment of the audio and video signals in real-time. For example, the metadata may indicate that when a first pundit begins speaking, a sponsored advertisement for a first type of product should be visible in the associated video frame or frame(s). If a particular sponsored advertisement is not present, then the backend system(s) may determine that the audio and video are misaligned. While reference is made to processing performed by back-end system(s), this is merely exemplary and the processing may also be performed, in part or in whole, on the devices capturing the content, the viewer devices, a combination of any of these, etc. The indication of the visual cue that is associated with a given audio cue may also be provided in any other suitable manner.

Additionally, while examples are described herein in which audio cues are used to generate visual cues that are used to detect audio and video misalignment, the opposite approach may also be used. That is, visual cues may be used as triggers to produce audio cues that may be used to detect audio-video misalignment in a similar manner that the visual cues may be used. For example, a device configured to capture video content, such as a camera or other type of device, may capture a particular visual cue. An audio cue that is subtle and unnoticeable by a viewer may then be embedded into the audio signal at the source of the live content to serve as an audio cue in a similar manner that a generated visual cue may be used as aforementioned. In embodiments, the audio cue may be an inaudible tone that is undetectable or nearly undetectable by humans but is able to be detected within the audio signal by a system.

When a misalignment between the audio and video of the live content is detected, a number of different types of actions may be automatically performed to remedy the misalignment. In some instances, the misalignment may be remedied automatically by the system. For example, the backend system(s) may introduce a time delay between the video signal and audio signal for the live event to synchronize the audio and video signal. The synchronization may also be performed in any other suitable manner. As another example, the system may produce an alert and transit the alert to a user device to provide an indication that there is an audio-synchronization issue that may be manually addressed by the user. For example, the user may perform a troubleshooting process to identify a root cause of the synchronization issues.

Additionally, given the reduced computational complexity of the approach described herein compared to conventional approaches using DNNs, the misalignment may be automatically remedied by individual devices. That is, the backend system(s) may not necessarily be required to detect the audio-video misalignment. For example, the misalignment may be remedied by the devices capturing the live content (for example, the microphone, camera, etc.). The misalignment may also be automatically remedied by viewer devices (for example, a laptop or desktop computer, television, tablet, and/or any other type of device that is used by a viewer to view the live content). For example, these devices themselves may use the visual cues to identify misalignment and may introduce a delay between the audio and video signals to ensure that the two signals are properly synchronized (or may remedy the misalignment in any other suitable manner). This allows individual devices to selectively modify the audio and video feeds based on the degree of misalignment experienced by that particular device. That is, different devices may experience different degrees of audio-video misalignment based on various factors such as hardware capabilities of the devices, network connectivity of the devices, etc. Thus, if a first viewer device is experiencing a greater degree of misalignment than a second device, the first device may introduce a larger delay than the second device such that the viewers of the two devices may still view synchronized live content regardless of the degree of misalignment experienced by their individual devices. With conventional approaches, the required computation may be too intense for the hardware included within these individual devices.

The systems and methods described herein provide a number of technical improvements to audio and video misalignment detection and correction over conventional approaches. As aforementioned, the approach described herein reduces or eliminates processing latency by not requiring visual cues to be embedded in post-processing. The approach is also less computationally intensive than conventional approaches such that some or all the processing may be performed on viewer devices. Similarly, the approach may also allow processing to be performed on devices located at the source of the live content, such as on a microphone as described in the aforementioned use case. The approach also improves the accuracy of misalignment detection as the system uses a pre-determined visual element as the point of comparison, whereas some conventional approaches rely on estimations performed using neural networks, and other types of machine learning models.

FIG. 1 depicts one example use case 100 for mitigating audio-video misalignment.

Particularly, the use case 100 shows one example implementation of the audio-video misalignment approach in which devices located at the source of the live content are used to detect the audio cues and generate the corresponding visual cues. In this use case 100, the source of the live content is a stadium 103 in which a sports event is being played and broadcasted live to various viewers and the devices are microphones (for example, a first microphone 106 associated with a first pundit 104 and a second microphone 108 associated with a second pundit 105). Each of the microphones also includes a logo (for example, the first microphone 106 includes a first logo 107 and the second microphone 108 includes a second logo 109). The logos may be manipulated by the microphones in a number of different ways such that the logos may be manipulated to serve as visual cues. For example, the microphones may include digital displays (or other types of displays), and the logos may be displayed via the digital displays. Thus, the color, shape, size, and/or any other characteristics of the logos may be manipulated. The logos may also be displayed on the microphone in any other suitable manner without requiring the use of a display.

Turning to the first scene 102 of the use case 100, the first pundit 104 and the second pundit 105 are shown having a discussion about the game that is taking place live within the stadium 103. The first pundit 104 is speaking, which results in corresponding audio 111 (for example, the audio 111 may be a waveform associated with the speech of the first pundit 104) being produced. The first microphone 106 detects the audio 111 that is produced as the first pundit speaks 104.

Turning to scene 112, the first microphone 106, based on detecting the audio 111 produced as the first pundit speaks 104, modifies the first logo 107 to provide a visual cue that may be used for audio-visual misalignment detection. In the use case 100, the modification to the first logo 107 is shown as the microphone 106 changing a color of the first logo 107 from a first color shown in the first scene 102 to a second color shown in the second scene 112 (represented by the different types of shading shown in the first logo 107 in the first scene 102 and the first logo 107 shown in the second scene 112). The first logo 107 being presented within the portion of the video signal (for example, within one or more video frames of the video signal) intended to be associated with the audio 111 (for example, the video frame(s) showing the first pundit 104 speaking to produce the audio 111) thus serves as the visual cue for use by the system to determine if the audio signal and video signal are properly aligned. If the system analyzes portions of the video signal and the audio signal that are being processed to be transmitted together to a viewer device and determines that the audio cue (the audio 111) is present in the portion of the audio signal but the visual cue (the first logo 107 being the second color) is not present in the portion of the video signal, then the system may determine that an audio-video misalignment exists.

Figure 4:
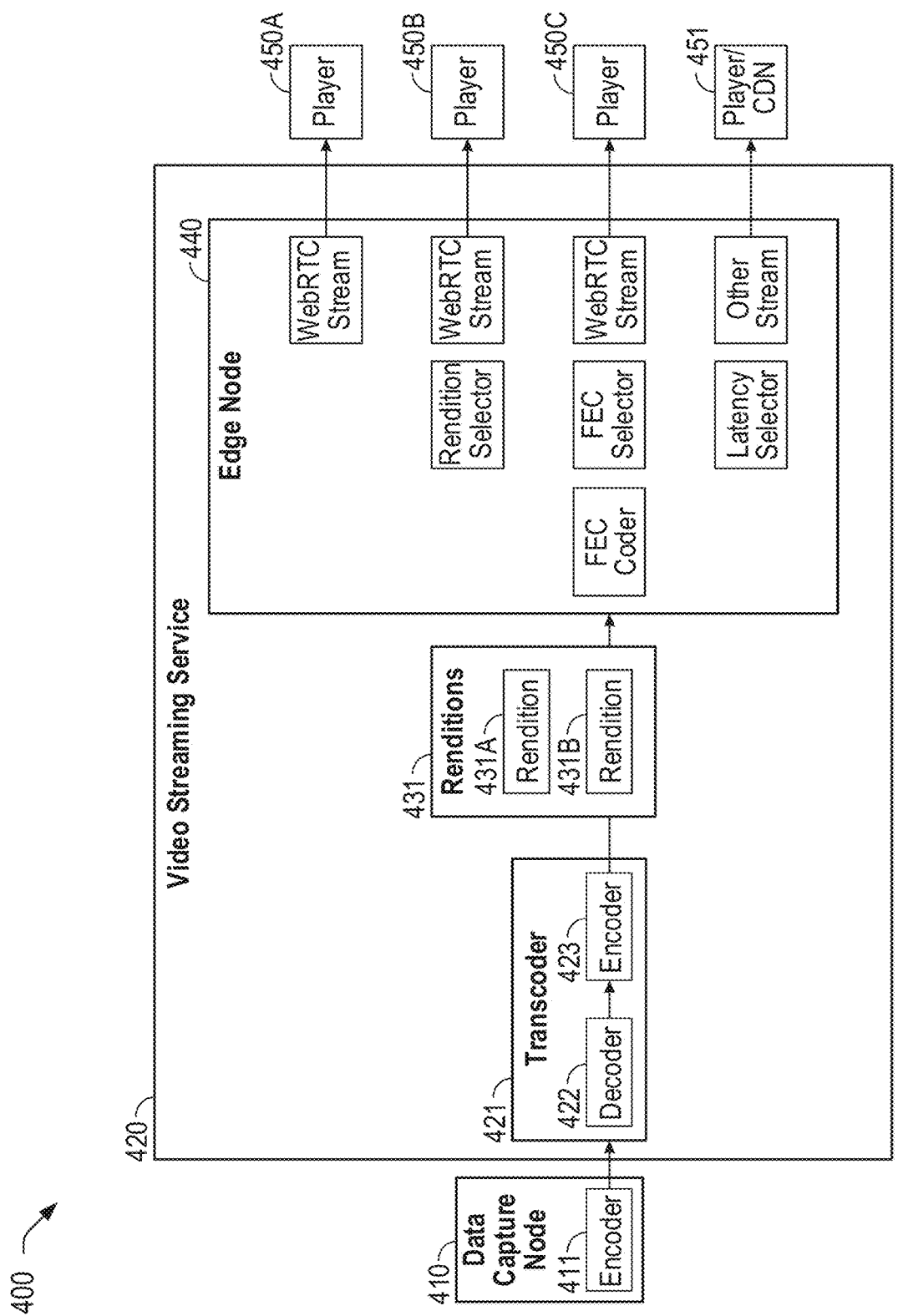
FIG. 4 depicts a system architecture mitigating audio-video misalignment in accordance with one or more example embodiments of the disclosure.
Figure 7:
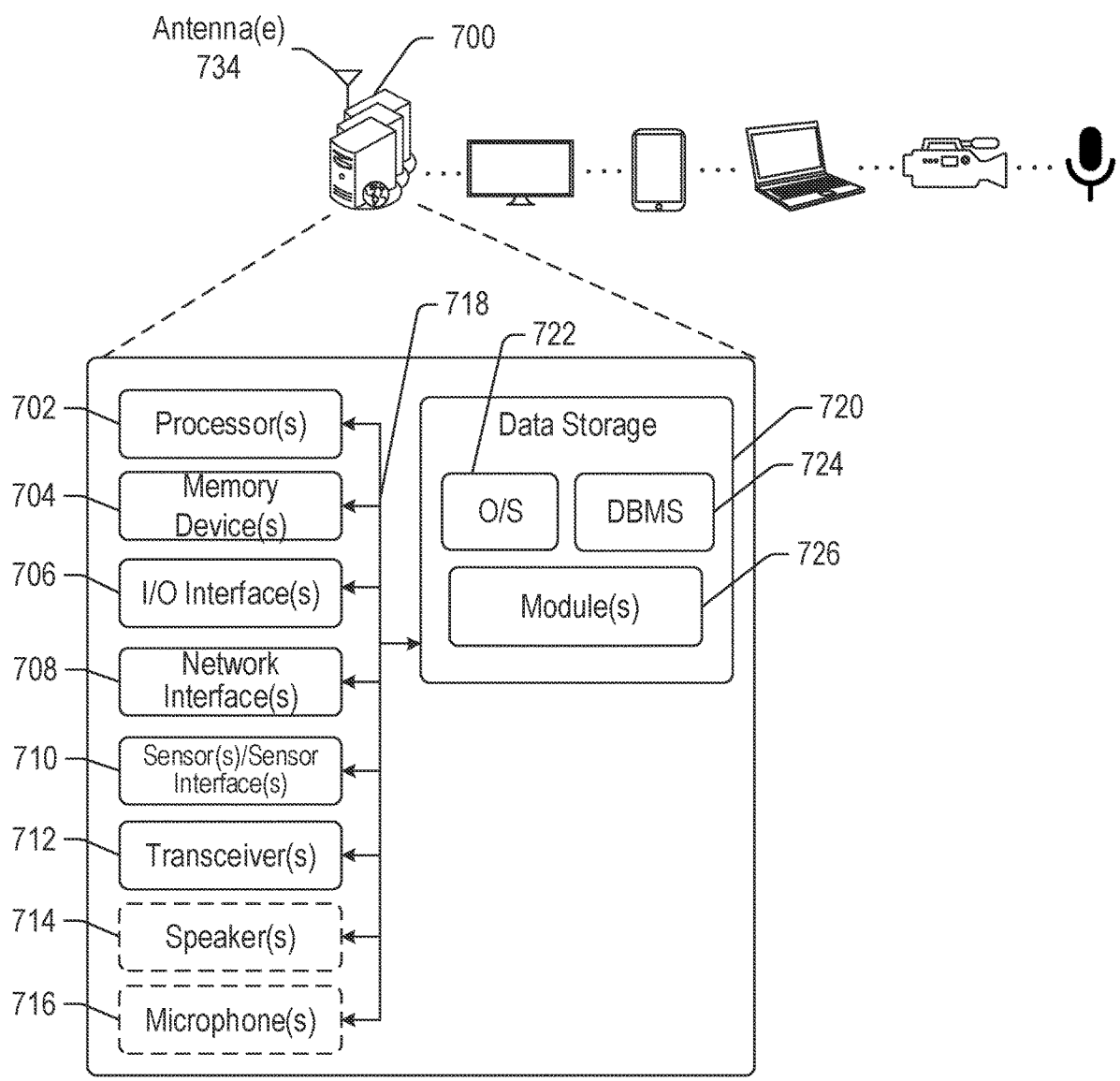
FIG. 7 depicts an example computing device in accordance with one or more example embodiments of the disclosure.

Reference to any processing performed by the "system" may generally refer to any of the elements of the system architecture 400 shown in FIG. 4, the computing device 700 of FIG. 7, etc. For example, the processing may be performed on one or a combination of devices located at the source of the live content, a backend system, viewer devices, etc.

Figure 2A:
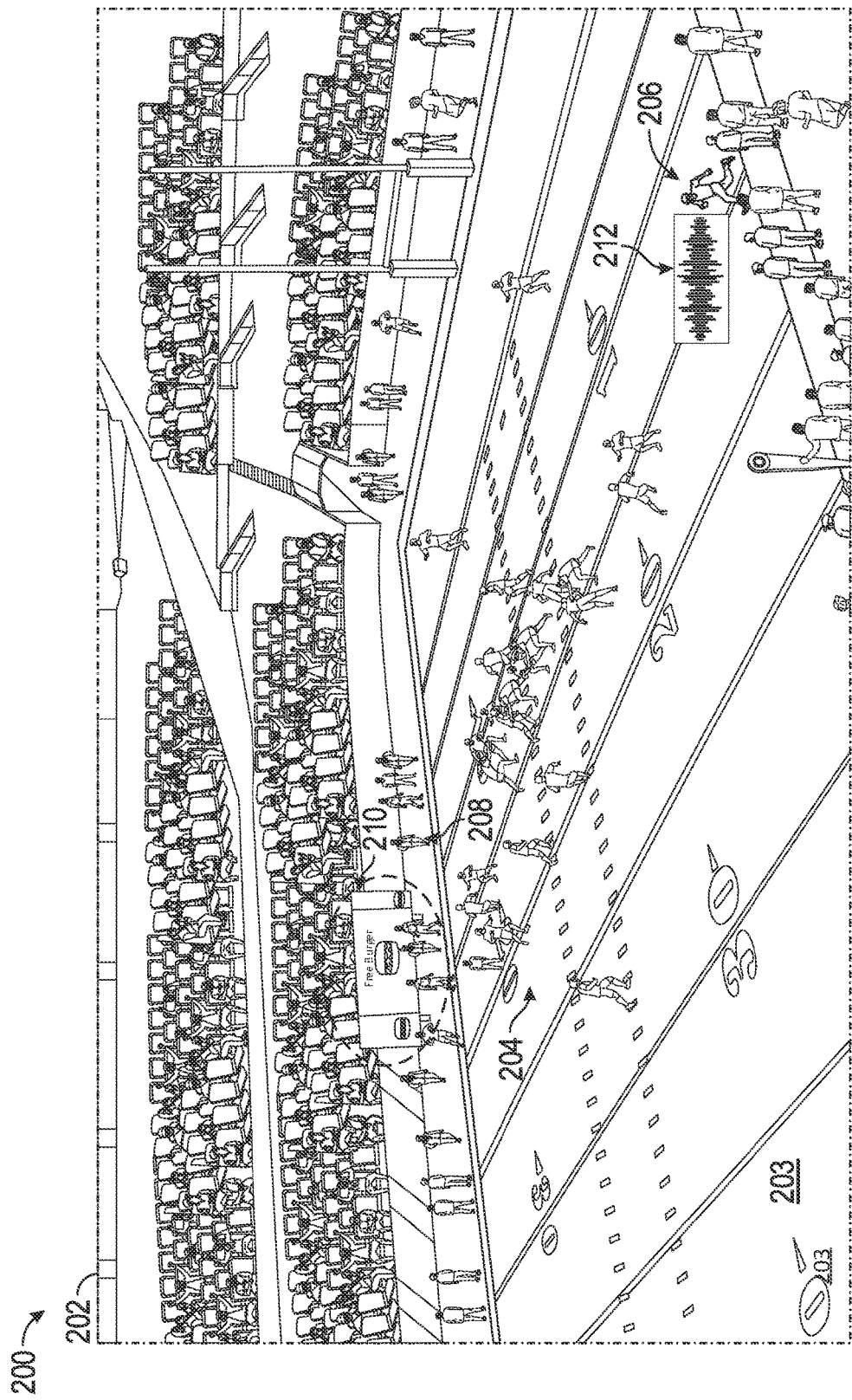
FIGS. 2A-2B depict another use case for mitigating audio-video misalignment in accordance with one or more example embodiments of the disclosure.
Figure 2B:
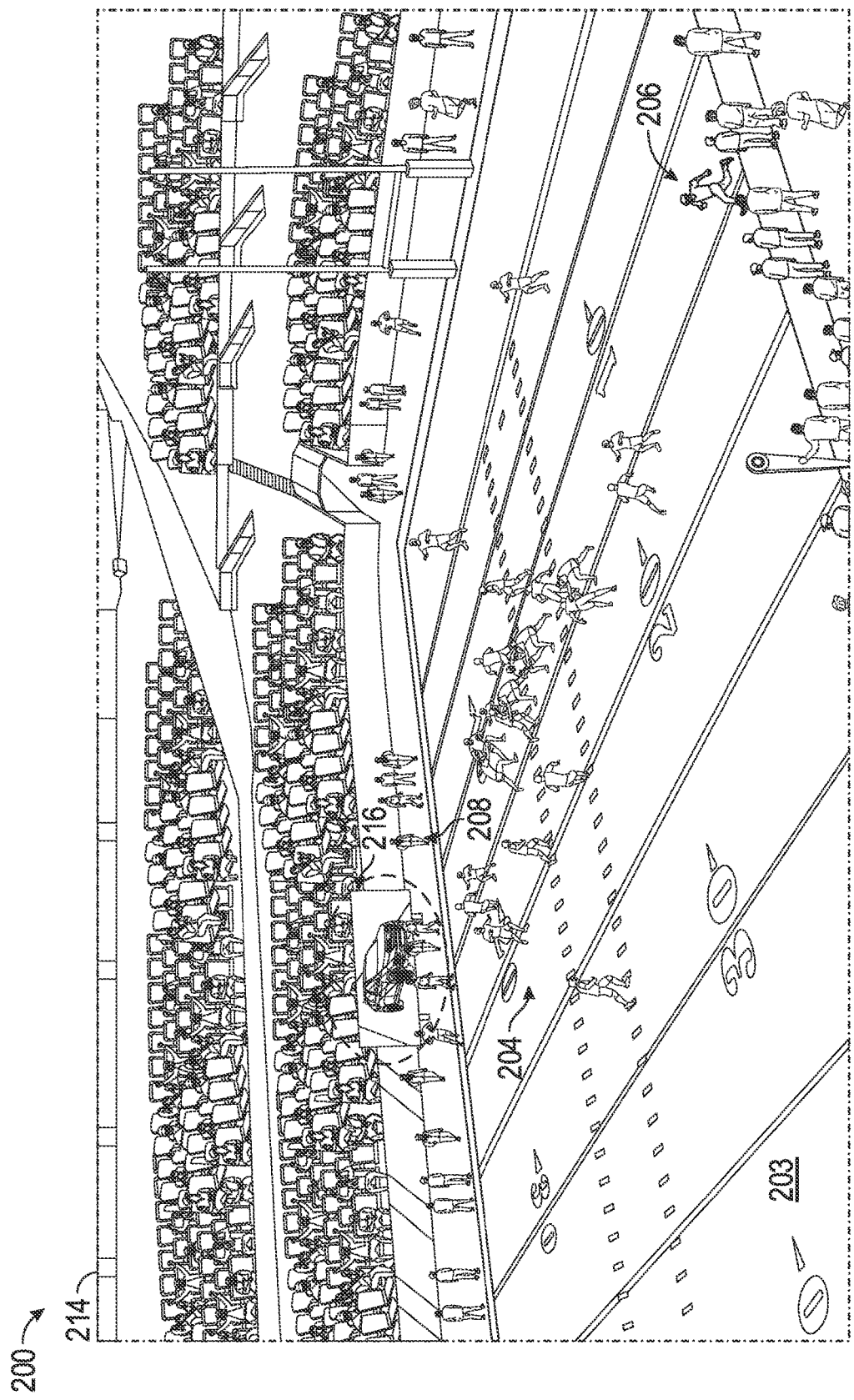

FIGS. 2A-2B depict another example use case 200 for mitigating audio-video misalignment. The use case 200 shows another non-limiting example of a type of visual cue that may be used to detect audio-video misalignment associated with live content. For consistency, the use case 200 also involves an American football game. It should be noted, however, that the systems and methods described herein are applicable to any type of live (or even pre-recorded) content in which audio-video misalignment may occur as well.

Shown in scene 202 of the use case 200 are a number of players 204 and a referee 206 that are physically located at the source of the live content, the stadium 203. Also shown at the stadium 203 is a digital banner 208 that is used to display various types of information to fans that are viewing the game live at the stadium 203. For example, the digital banner 208 may display a score of the game, player statistics, etc. The digital banner 208 may also display one or more digital advertisements. For example, an advertiser may pay a fee so that a digital advertisement provided by the advertiser is displayed on the digital banner 208 during the game for the fans to view. In the scene 202, a first digital advertisement 210 for a fast food restaurant is shown as being displayed.

Additionally, the scene 202 shows the referee 206 blowing a whistle, which produces audio 212 (for example, the referee may blow the whistle to indicate that a penalty has been called on one of the players 204 during a play of the game). This audio 212 may be detected by a device (any reference to a singular device, or other elements, herein is not intended to be limiting and may similarly refer to any other number of devices, or other elements) configured to capture audio, such as a microphone provided on the referee 206 a player, and/or at any other location within the stadium 203 (as well as any other type of device configured to capture audio). Based on this detected audio cue, a change may be made to the digital banner 208 to provide a visual cue to associate with the audio cue (the audio 212). As shown in scene 214, the change to the digital banner 208 may include presenting a second digital advertisement 216 for a car. Thus, the system may use the second digital advertisement 216 for the car as the visual cue for determining if there is an audio-video misalignment in the live feed of the football game. For example, if the system identifies that a video frame associated with a particular audio segment including the audio 212 does not include the second digital advertisement 216 being presented at the digital banner 208, then the system may determine that an audio-video misalignment exists.

Again, although the use case 200 shows the visual cue as being a change in a type of advertisement that is displayed, this is merely exemplary and any other visual cue may also be used. For example, the background color of the digital banner 208 may be modified (or any other color shown on the digital banner 208), an animation or other type of image (other than an advertisement) shown on the digital banner 208 may be modified, and/or any other type of visual modification may be performed. Further, the presentation of the visual cue on the digital banner 208 is also merely an example of a location at which a visual cue may be displayed and the visual cue may also be displayed at any other location within the stadium 203 as well.

Figure 3:
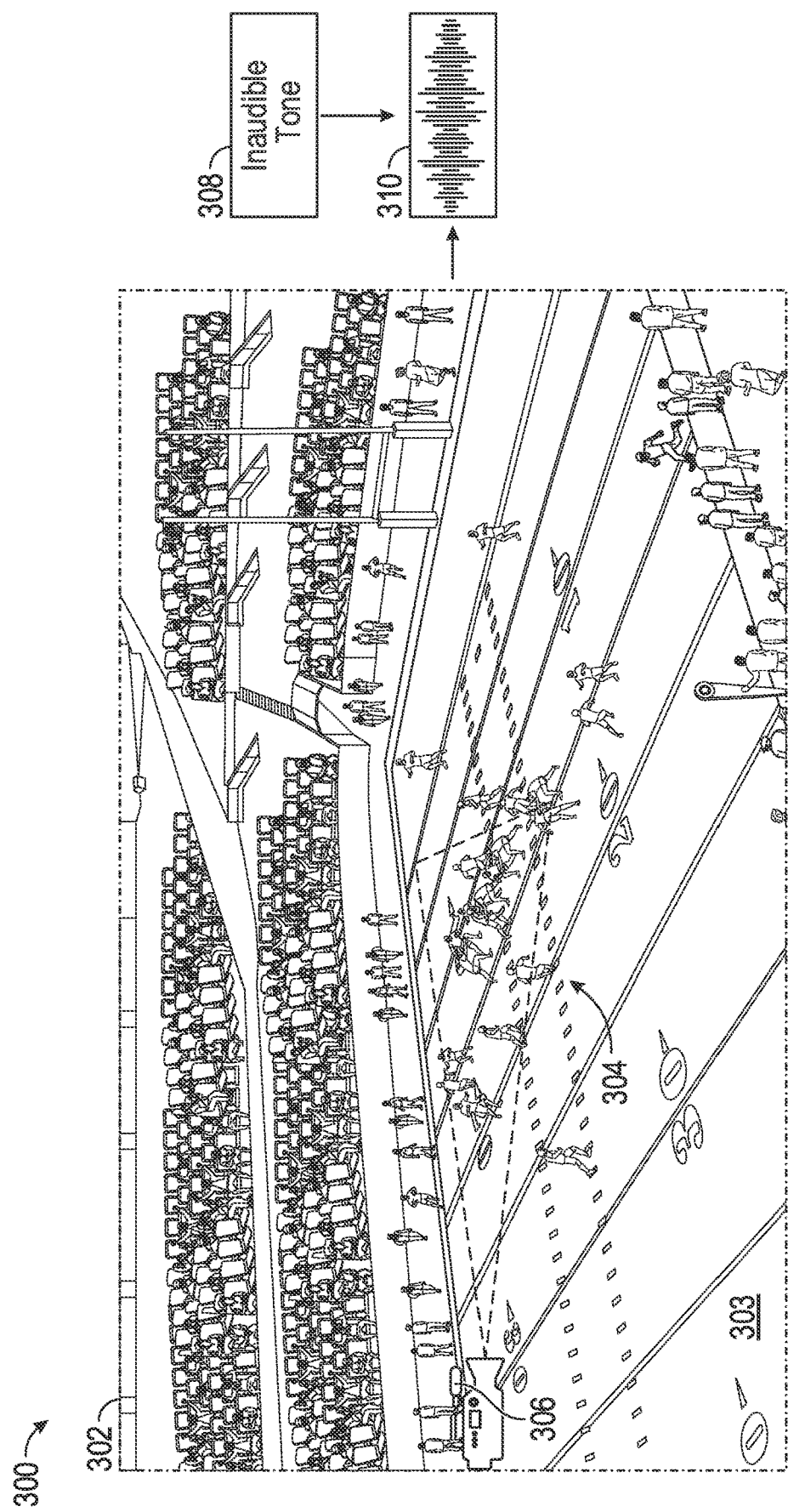
FIG. 3 depicts another use case for mitigating audio-video misalignment in accordance with one or more example embodiments of the disclosure.

FIG. 3 depicts yet another example use case 300 for mitigating audio-video misalignment. The use case 300 of FIG. 3 illustrates that the approach described herein is not necessarily limited to use of a visual cue and that an audio cue (or any other type of cue) may also be used to determine if audio-video misalignment exists.

Similar to use case 200, shown in scene 302 of the use case 300 shows a number of players 304 that are physically located at the source of the live content, the stadium 303. The scene 302 shows that a play is occurring during the live game taking place within the stadium 303. Particularly, an initiation of a play has occurred in which the ball was snapped to a quarterback of the offensive team. This specific action may be a visual cue that serves as a trigger to generate an audio cue for audio-video misalignment detection in a similar manner that the visual cue was generated based on the blowing of the whistle in the use case 200. However, any other type of visual change that occurs during the live sporting event may also be used as a visual cue that serves as a trigger for producing a corresponding audio cue.

This visual cue is detected by a device configured to capture video, such as camera 306 (or any other number of cameras 306). For example, the camera 306 may be provided in the stadium 306 to capture video that serves as the video signal that is transmitted to viewer devices such that viewers may view the American football game on their viewer devices. However, any other type of device configured to capture video may also be used.

In embodiments, the audio cue may be an inaudible tone 308 that is embedded within the audio signal 310 associated with the live content (for example, the audio from the game). The inaudible tone 308 may include a frequency that is not perceivable by some or all humans. For example, the inaudible tone 308 may include a frequency in the range of 18.5-19.5 kHz. The inaudible tone 308 may also include multiple frequencies. In this manner, the inaudible tone 308 may be detectable without impacting the viewing experience of a viewer. That is, the viewer may not be able to hear the inaudible tone 308. Additional details about the use of inaudible tones may be found within at least U.S. application Ser. No. 18/524,557, filed Nov. 30, 2023, which is incorporated herein by reference in its entirety. The inaudible tone 308 may also be embedded within the audio signal 310 associated with the live content in any other suitable manner.

FIG. 4 depicts an example system architecture 400. The system architecture 400 depicts some example components used to process audio and/or video signals associated with live content for transmission to one or more viewer devices (for example, players 450A-C). As shown in FIG. 4, video and audio content may be captured at one or more data capture nodes 410 and transmitted to a video streaming service 420, which, in turn, may transmit the video content to one or more recipients such as players 450A-B. In some examples, video and audio content may also be transmitted to player/Content delivery Network (CDN) 451. In some examples, players 450A-C may be players that are affiliated with (e.g., that are developed and/or distributed by) the video streaming service 420, while player/CDN 451 may be a third-party player or CDN that is not directly affiliated with the streaming service 420. In some examples, video may be transmitted from data capture node 410 to video streaming service 420 and, in turn, from video streaming service 420 to players 450A-C and player/CDN 451 over one or more communications networks, for example one or more local area networks (LANs) and/or one or more wide area networks (WANs), such as the Internet. Additionally, in some examples, video may be transmitted from data capture node 410 to video streaming service 420 and, in turn, from video streaming service 420 to players 450A-C and player/CDN 451 using streaming transmission techniques, in which portions of transmitted content may be received and played while subsequent portions of the transmitted content are being transmitted. In some examples, the video content captured and transmitted by data capture node 410 may include video of a live event, such as a video game, sporting event, news event, or other live event. In some examples, users may be commenting, chatting or otherwise describing actions within these live events. In these and other cases, it may be particularly advantageous to reduce and minimize latency for video of live events.

In some examples, data capture nodes 410 may include devices such as cameras, microphones, and/or any other types of devices that may be used to capture video and/or audio. In some instances, the data capture nodes 410 may capture video using screen capture software, one or more cameras, and/or other video capture components. In the example of FIG. 4, encoder 411 of data capture node 410 may encode the captured video for transmission to video streaming service 420 over one or more networks. The transmitted video may be received by video streaming service 420 and provided to transcoder 421, at which decoder 422 may decode the incoming video. Encoder 423 may then re-encode the video for transmission to players 450A-N and player/CDN 451 over one or more networks.

Video may be transmitted from the video streaming service 420 using adaptive bitrate streaming, in which video is encoded into multiple different renditions 431 (including renditions 431A-B and potentially other renditions) having different respective image qualities (e.g., bitrates, resolutions, profiles, frame rates, etc.) and appropriate renditions are selected, and dynamically switched, for individual viewers based on changing network conditions and other characteristics. In some examples, encoder 423 may encode the source video content received from the data capture node 410 into the multiple different renditions 431. In one specific example, rendition 431A may be a 1080p resolution rendition of the video content, while rendition 431B may be a 720p resolution rendition of the video content. The encoded renditions 431 may then be delivered to edge node 440 for transmission to players 450A-C and player/CDN 451, such as using various techniques described in detail below. The edge node 440 is a node that transmits video content from the video streaming service 420 to one or more players.

The players 450A-450C may be any type of device, such as a smartphone, desktop computer, laptop computer, tablet, smart television (for example, a television with Internet connectivity, the capability to install applications, etc.), and/or any other type of device. The players 450A-450C may allow a user, such a viewer to view the live streamed content in real-time or near real-time depending on a delay caused by processing and transmitting the live content from the data capture node 410 to the players 450A-450C.

Finally, any of the elements (for example, the data capture node 410, any of the elements of the video streaming service 420, any of the players 450A-450C, the player/CDN 451, etc.) of the system 400 may include any of the elements of the computing device 700 as well (such as the processor 702, memory 704, etc.).

Figure 5:
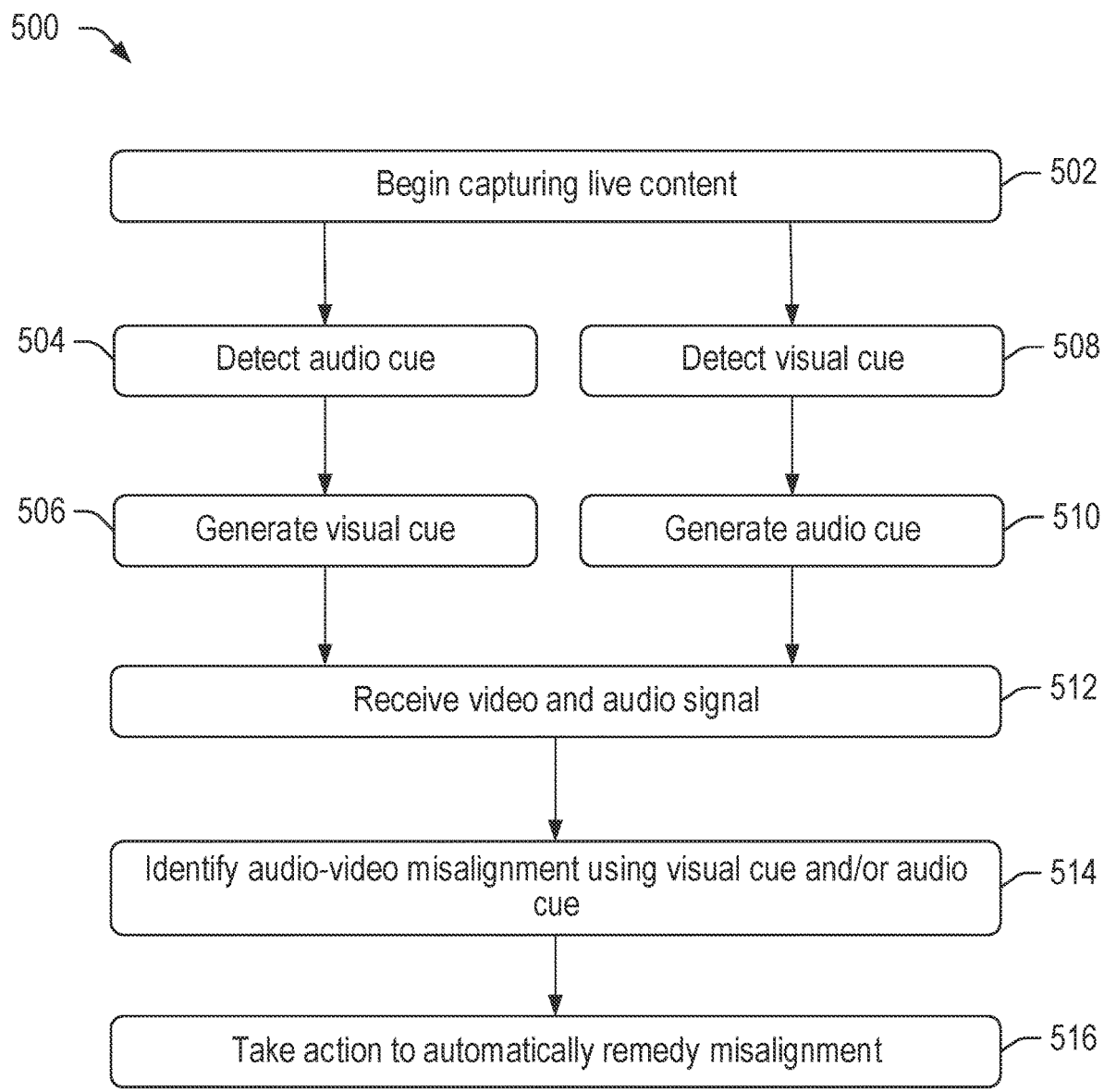
FIG. 5 depicts an example flow diagram for mitigating audio-video misalignment in accordance with one or more example embodiments of the disclosure.

FIG. 5 depicts an example flow diagram 500 for mitigating audio-video misalignment. The flow diagram 500 depicts some of the high-level operations associated with the detection and mitigation and/or elimination of audio-video misalignment in live (or pre-recorded) content. Beginning with operation 502, live content may be captured. For example, if the live content is a sports event, devices configured to capture video and/or audio, such as cameras, microphones, etc. provided at the location of the live event may begin capturing the audio and video associated with the live sports event.

As the video and/or audio content is captured, operations 504 and 508 may alternatively be performed. Beginning with operation 504, an audio cue may be detected in the audio signal being captured. Continuing the example shown in use case 100, the audio cue may be a pundit beginning to speak during a discussion with another pundit. However, the audio cue may be any other portion of the audio signal. Based on detecting the audio cue, operation 506 may involve generating a visual cue that may be used as a reference point for determining if audio-video misalignment occurs in the live content being transmitted to viewers.

As aforementioned, the opposite approach may also be taken, as shown through operations 508-510. That is, in operation 508, a visual cue may be detected in the video signal being captured. Based on detecting the visual cue, operation 510 may involve generating an audio cue that may be used as a reference point for determining if audio-video misalignment occurs in the live content being transmitted to viewers. For example, the audio cue may be an inaudible tone that is embedded within the audio signal associated with the live content, as described with respect to use case 300 of FIG. 3.

The use of the different types of cues does not necessarily have to be mutually exclusive and may be used in combination even during the same stream of live content. For example, in some instances, audio cues may trigger visual changes to be performed at the source of the live content, and in some instances, visual cues may trigger inaudible tones to be embedded. That is, both of these types of cues may be used in combination. The metadata that is provided along with the audio and video signals for processing before transmission to the viewers may indicate which audio and visual cues should be found within corresponding portions of the audio and video signal to determine if misalignment exists.

At operation 512, one or more devices located at the source of the live content may begin capturing audio and video associated with the live content. For example, one or more microphones may be positioned to capture audio associated with the live content. If the live content is a sports event, microphones may be provided on player equipment, with pundits discussing the game, with sideline reporters, with coaches and staff, etc. Continuing the same example, cameras may be provided that may capture video of the sports event. However, these types of devices are merely exemplary and any other types of devices may also be used to capture the live content.

At operation 514, the system may identify an audio-video misalignment by determining that an expected visual cue is not present in the portion of the video signal (for example, one or more video frame(s)) associated with a corresponding portion of the audio signal that includes an associated audio cue. For example, if the portion of the audio includes the pundit speaking, but the corresponding video frame(s) to be transmitted to the viewer does not show the visual cue that was generated based on that particular audio cue, then it may be determined that misalignment exists. However, if the visual cue is found in the corresponding video frame(s), then it may be determined that the audio signal and the video signal is currently aligned and that the live content may be transmitted to the viewers without any alignment being performed. A similar approach may be taken if audio cues are not identified that correspond to visual cues that triggered the generation of the audio cues (for example, operations 508-510).

At operation 516, one or more actions may automatically be taken to remedy the detected audio-video misalignment. For example, the backend system(s) may introduce a time delay between the video signal and audio signal for the live event to synchronize the audio and video signal. The synchronization may also be performed in any other suitable manner. As another example, the system may produce an alert and transit the alert to a user device to provide an indication that there is an audio-synchronization issue that may be manually addressed by the user.

Additionally, as aforementioned, given the reduced computational complexity of the approach described herein compared to conventional approaches using DNNs, the misalignment may be automatically remedied by individual devices. For example, the misalignment may be remedied by the devices capturing the live content (for example, the microphone, camera, etc.). The misalignment may also be automatically remedied by viewer devices (for example, a laptop or desktop computer, television, tablet, etc. that is used by a viewer to view the live content). For example, these devices themselves may use the visual cues to identify misalignment and may introduce a delay between the audio and video signals to ensure that the two signals are properly synchronized (or may remedy the misalignment in any other suitable manner). This allows individual devices to selectively modify the audio and video feeds based on the degree of misalignment experienced by that particular device. That is, different devices may experience different degrees of audio-video misalignment based on various factors such as hardware capabilities of the devices, network connectivity of the devices, etc. Thus, if a first viewer device is experiencing a greater degree of misalignment than a second device, the first device may introduce a larger delay than the second device such that the viewers of the two devices may still view synchronized live content regardless of the degree of misalignment experienced by their individual devices. With conventional approaches, the required computation may be too intensity for the hardware included within these individual devices.

Figure 6:
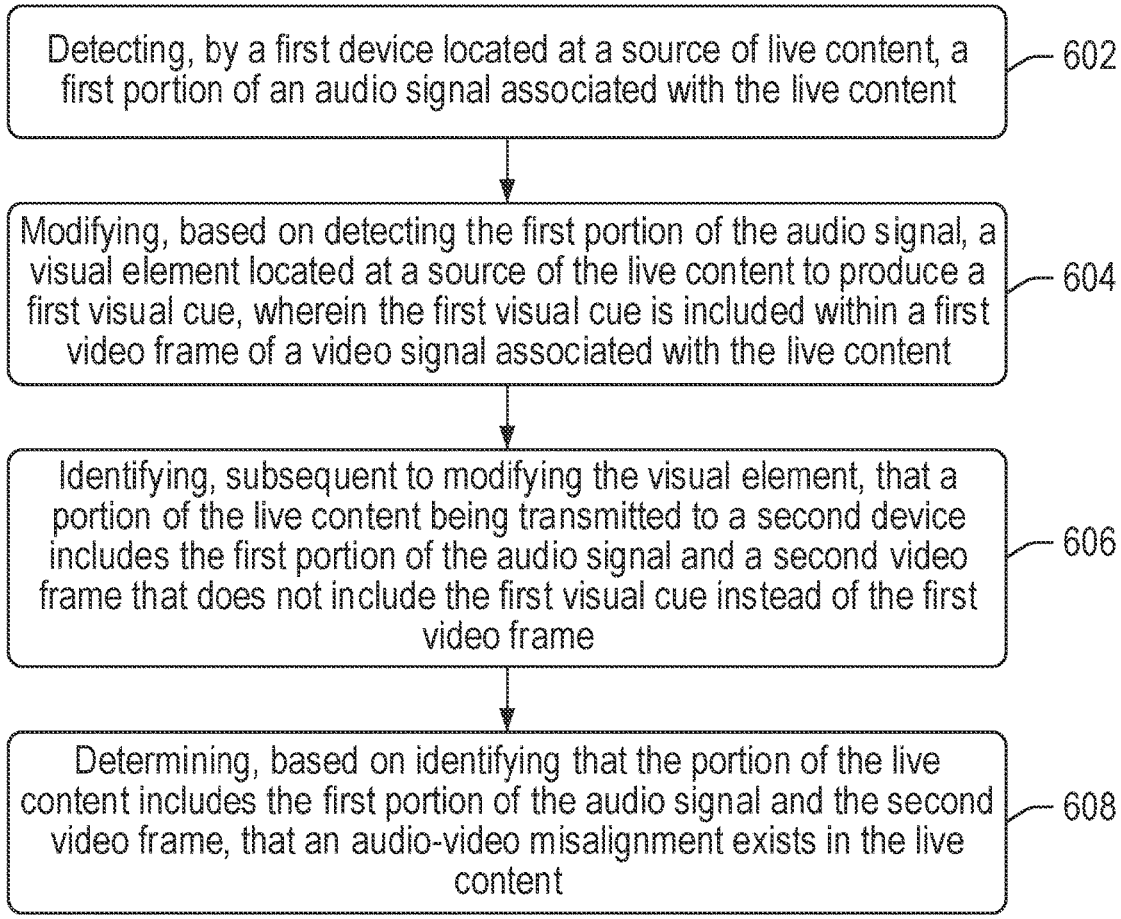
FIG. 6 depicts an example method for mitigating audio-video misalignment in accordance with one or more example embodiments of the disclosure.

FIG. 6 depicts an example method 600 for mitigating audio-video misalignment. Some or all of the blocks of the process flows or methods in this disclosure may be performed in a distributed manner across any number of devices or systems (such as any of the elements of the system architecture 400, any of the devices and/or systems of use cases 100-300, etc.). The operations of the method 600 may be optional and may be performed in a different order.

At block 602 of the method 600, computer-executable instructions stored on a memory of a system or device (such as any of the elements of the system architecture 400, any of the devices and/or systems of use cases 100-300, etc.) may be executed to detect, by a first device located at a source of live content, a first portion of an audio signal associated with the live content. For example, the first device may be a microphone (or multiple microphones) provided at the physical location of the live content that capture audio produced at the source of the live content. The first portion of the audio signal may include an audio cue that serves as a trigger for generating a visual cue to use for audio-video misalignment as described herein.

At block 604 of the method 600, computer-executable instructions stored on a memory of a system or device may be executed to modify, based on detecting the first portion of the audio signal, a visual element located at a source of the live content to produce a first visual cue, wherein the first visual cue is included within a first video frame of a video signal associated with the live content.

At block 606 of the method 600, computer-executable instructions stored on a memory of a system or device may be executed to identify, subsequent to modifying the visual element, that a portion of the live content being transmitted to a second device includes the first portion of the audio signal and a second video frame that does not include the first visual cue instead of the first video frame. For example, a combination of video and audio signals may be received and processed for transmitting to viewer devices to allow viewers to view the live content. The system performing the processing (which, as aforementioned, may be video streaming service 420 or any other backend system) may identify a portion of the audio signal including the audio cue and may check to determine if a corresponding portion of the video signal includes the visual cue that was previously generated based on the audio cue. This processing does not necessarily need to be performed on the backend and may also be performed on the device(s) capturing the video and/or audio and/or the viewer device(s) as well.

At block 608 of the method 600, computer-executable instructions stored on a memory of a system or device may be executed to determine, based on identifying that the portion of the live content includes the first portion of the audio signal and the second video frame, that an audio-video misalignment exists in the live content. As mentioned above, the system performing the processing may identify a portion of the audio signal including the audio cue and may check to determine if a corresponding portion of the video signal includes the visual cue that was previously generated based on the audio cue. If the corresponding portion of the video signal (for example, one or more video frames) does not include the visual cue, then the system determines that the misalignment exists. However, if the visual cue is present in the one or more video frame(s), then the video and audio signal are properly aligned. A similar approach may be used if the opposite approach is employed in which inaudible tones are embedded in the audio signal based on visual cues.

FIG. 7 is a schematic block diagram of an illustrative computing device 700 in accordance with one or more example embodiments of the disclosure. The computing device 700 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 700 may correspond to an illustrative device configuration for the devices of FIGS. 1-6 (such as any of the elements of the system architecture 400, any of the devices and/or systems of use cases 100-300, such as the microphone 106, microphone 108, camera 306, etc.).

The computing device 700 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The computing device 700 may further include one or more buses 718 that functionally couple various components of the computing device 700. The computing device 700 may further include one or more antenna (e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the computing device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the computing device 700 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 704 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 720 may include removable storage and/or nonremovable storage including, but not limited to, magnetic storage, optical disk storage, and/or tape storage. The data storage 720 may provide nonvolatile storage of computer-executable instructions and other data. The memory 704 and the data storage 720, removable and/or nonremovable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for nonvolatile storage.

More specifically, the data storage 720 may store one or more operating systems (O/S) 722; one or more database management systems (DBMS) 724; and one or more program module(s), applications, engines, computer-executable code, scripts, or the like such as, for example, one or more module(s) 726. Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the computing device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, purchase history information, user action information, user profile information, a database linking search queries and user actions, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the computing device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the module(s) 726 may include computer-executable instructions, code, or the like that responsive to execution by one or more of the processor(s) 702 may perform any functions described herein (for example, functions associated with any of the elements of the system architecture 400, any of the devices and/or systems of use cases 100-300, etc.), including, but not limited to, detecting audio/visual cues and generating corresponding audio/visual cues for detecting of audio-video misalignment and/or any other functionality described herein.

Referring now to other illustrative components depicted as being stored in the data storage 720, the O/S 722 may be loaded from the data storage 720 into the memory 704 and may provide an interface between other application software executing on the computing device 700 and hardware resources of the computing device 700. More specifically, the O/S 722 may include a set of computer-executable instructions for managing hardware resources of the computing device 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 700 is a user device, the DBMS 724 may be any suitable light-weight DBMS optimized for performance on a user device.

Referring now to other illustrative components of the computing device 700, the input/output (I/O) interface(s) 706 may facilitate the receipt of input information by the computing device 700 from one or more I/O devices as well as the output of information from the computing device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna (e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 700 may further include one or more network interface(s) 708 via which the computing device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna (e) 734 may include any suitable type of antenna depending, for example, on the communications protocols used to transmit or receive signals via the antenna (e) 734. Non-limiting examples of suitable antennas may include directional antennas, nondirectional antennas, dipole antennas, folded dipole antennas, patch antennas, multiple-input multiple-output (MIMO) antennas, or the like. The antenna (e) 734 may be communicatively coupled to one or more transceivers 712 or radio components to which or from which signals may be transmitted or received.

As previously described, the antenna (e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 734 may be configured to transmit or receive radio frequency signals within any suitable frequency range forming part of the unlicensed portion of the radio spectrum.

The antenna (e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna (e) 734—transmitting or receiving radio frequency (RF) signals in the bandwidth and/or channels corresponding to the communications protocols utilized by the computing device 700 to communicate with other devices. The transceiver(s) 712 may include hardware, software, and/or firmware for modulating, transmitting, or receiving—potentially in cooperation with any of antenna (e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computing device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computing device 700 may include alternate and/or additional hardware, software, or firmware components beyond those described or depicted without departing from the scope of the disclosure. More particularly, it should be appreciated that software, firmware, or hardware components depicted as forming part of the computing device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   detecting, by a microphone located at a source of live content being broadcasted to one or more viewer devices, a pre-determined audio cue within an audio signal associated with the live content;
   modifying, based on detecting the pre-determined audio cue, a visual element located at a source of the live content to produce a first visual cue, wherein the first visual cue is included within a first video frame of a video signal associated with the live content;
   identifying, that a portion of the live content being transmitted to a second device includes the pre-determined audio cue and a second video frame that does not include the first visual cue instead of the first video frame;
   determining, based on identifying that the portion of the live content includes the pre-determined audio cue and the second video frame, that an audio-video misalignment exists in the live content;
   automatically introducing a delay in the audio signal or the video signal to synchronize the audio signal and the video signal; and
   transmitting the audio signal and the video signal to the one or more viewer devices for presentation of the live content to a viewer.

2. The method of claim 1, wherein the visual element is provided on the microphone, and wherein modifying the visual element is also performed by the microphone.

3. The method of claim 2, wherein determining that the audio-video misalignment exists is performed by the second device, wherein the second device is a viewer device.

4. The method of claim 1, further comprising:
   detecting, by a third device located at the source of live content, a second visual cue within a third video frame of the video signal associated with the live content;
   modifying, based on detecting the second visual cue, a second portion of the audio signal associated with the live content to include an inaudible tone;
   identifying, subsequent to modifying the second portion of the audio signal, that a portion of the live content being transmitted to the second device includes the second visual cue a third portion of the audio signal that does not include the inaudible tone; and
   determining, based on identifying that the portion of the live content includes the second visual cue and the third portion of the audio signal, that an audio-video misalignment exists in the live content.

5. A method comprising:
   detecting, by a first device located at a source of live content, a first portion of an audio signal associated with the live content;
   modifying, based on detecting the first portion of the audio signal, a visual element located at a source of the live content to produce a first visual cue, wherein the first visual cue is included within a first video frame of a video signal associated with the live content;
   identifying, subsequent to modifying the visual element, that a portion of the live content being transmitted to a second device includes the first portion of the audio signal and a second video frame that does not include the first visual cue instead of the first video frame; and
   determining, based on identifying that the portion of the live content includes the first portion of the audio signal and the second video frame, that an audio-video misalignment exists in the live content.

6. The method of claim 5, further comprising:
   receiving metadata including an indication that the first portion of the audio signal is associated with the first visual cue, wherein determining that the audio-video misalignment exists is based on the metadata.

7. The method of claim 5, wherein the visual element is provided on the first device, and wherein modifying the visual element is also performed by the first device.

8. The method of claim 7, wherein the first device is a microphone.

9. The method of claim 5, wherein determining that the audio-video misalignment exists is performed by the second device, wherein the second device is a viewer device.

10. The method of claim 9, further comprising:
    providing, by the second device, a delay between the audio signal and the video signal of the live content to align the audio signal and the video signal.

11. The method of claim 5, further comprising:
    detecting, by a third device located at the source of live content, a second visual cue within a third video frame of the video signal associated with the live content;
    modifying, based on detecting the second visual cue, a second portion of the audio signal associated with the live content to include an audio tone;
    identifying, subsequent to modifying the second portion of the audio signal, that a portion of the live content being transmitted to the second device includes the second visual cue a third portion of the audio signal that does not include the audio tone; and
    determining, based on identifying that the portion of the live content includes the second visual cue and the third portion of the audio signal, that an audio-video misalignment exists in the live content.

12. The method of claim 5, wherein modifying the visual element comprises at least one of: transitioning from presentation of a first type of visual element instead of a second type of visual element, changing a color of the visual element, changing a shape of the visual element, changing a size of the visual element, or changing a frequency at which the visual element is presented.

13. A system comprising:
    memory that stores computer-executable instructions; and
    one or more processors configured to access the memory and execute the computer-executable instructions to:
    detect, by a first device located at a source of live content, a first portion of an audio signal associated with the live content;
    modify, based on detecting the first portion of the audio signal, a visual element located at a source of the live content to produce a first visual cue, wherein the first visual cue is included within a first video frame of a video signal associated with the live content;
    identifying, subsequent to modifying the visual element, that a portion of the live content being transmitted to a second device includes the first portion of the audio signal and a second video frame that does not include the first visual cue instead of the first video frame; and
    determining, based on identifying that the portion of the live content includes the first portion of the audio signal and the second video frame, that an audio-video misalignment exists in the live content.

14. The system of claim 13, wherein the one or more processors are further configured to execute the computer-executable instructions to:
    receive metadata including an indication that the first portion of the audio signal is associated with the first visual cue, wherein determining that the audio-video misalignment exists is based on the metadata.

15. The system of claim 13, wherein the visual element is provided on the first device, and wherein modifying the visual element is also performed by the first device.

16. The system of claim 15, wherein the first device is a microphone.

17. The system of claim 13, wherein determining that the audio-video misalignment exists is performed by the second device, wherein the second device is a viewer device.

18. The system of claim 13, wherein the one or more processors are further configured to execute the computer-executable instructions to:
provide, by the second device, a delay between the audio signal and the video signal of the live content to align the audio signal and the video signal.

19. The system of claim 13, wherein the one or more processors are further configured to execute the computer-executable instructions to:
detect, by a third device located at the source of live content, a second visual cue within a third video frame of the video signal associated with the live content;
modify, based on detecting the second visual cue, a second portion of the audio signal associated with the live content to include an audio tone;
identify, subsequent to modifying the second portion of the audio signal, that a portion of the live content being transmitted to the second device includes the second visual cue a third portion of the audio signal that does not include the audio tone; and
determine, based on identifying that the portion of the live content includes the second visual cue and the third portion of the audio signal, that an audio-video misalignment exists in the live content.

20. The system of claim 13, wherein modifying the visual element comprises at least one of: transitioning from presentation of a first type of visual element instead of a second type of visual element, changing a color of the visual element, changing a shape of the visual element, or changing a size of the visual element, or changing a frequency at which the visual element is presented.

* * * * *